United States Patent [19]

Legille et al.

[11] 4,277,273

[45] Jul. 7, 1981

[54] TREATMENT AND HANDLING OF METALLURGICAL SLAG

[76] Inventors: Edouard Legille, 165, rte de Trèves, Luxembourg; Carlo Heinz, rue du Bois, Niederanven, both of Luxembourg

[21] Appl. No.: 51,456

[22] Filed: Jun. 22, 1979

Related U.S. Application Data

[63] Continuation of Ser. No. 840,219, Oct. 7, 1977, abandoned.

[30] Foreign Application Priority Data

Oct. 12, 1976 [LU] Luxembourg ............................ 75978
Sep. 26, 1977 [LU] Luxembourg ............................ 78184

[51] Int. Cl.³ .............................................. C03B 37/00
[52] U.S. Cl. .......................................... 65/19; 55/354; 65/20; 65/141; 75/24; 209/138; 209/153; 222/195; 222/198; 209/638
[58] Field of Search ................. 65/19, 20, 141; 75/24; 264/11; 209/115, 120, 307, 138, 139 R, 153, 495; 222/202, 198, 195; 55/354

[56] References Cited

U.S. PATENT DOCUMENTS

| 1,008,204 | 11/1911 | Seghers .............................. 65/141 X |
| 2,255,206 | 9/1941 | Duncan .................................. 65/10 |
| 2,265,802 | 12/1941 | Cox ...................................... 222/202 |
| 3,099,494 | 7/1963 | Heinze .............................. 222/202 X |
| 3,379,345 | 4/1968 | Gehrung ............................. 222/195 |
| 3,594,142 | 7/1971 | Margesson et al. ............... 65/141 X |
| 3,738,820 | 6/1973 | Osborne et al. ........................ 65/19 |
| 3,833,354 | 9/1974 | Thümmler ........................... 65/19 X |
| 3,853,514 | 12/1974 | Post .................................... 55/354 X |

Primary Examiner—Robert L. Lindsay, Jr.
Attorney, Agent, or Firm—Watson, Cole, Grindle & Watson

[57] ABSTRACT

Disclosed is an installation for the treatment and handling of metallurgical slag which includes means for the disintegration of a flow of pyroplastic slag by mechanical impacts and cooling means for the cooling of the particles of slag formed by the disintegration. The installation comprises at least one perforated endless band positioned in the path of fall of the particles of slag projected by the disintegration means and cooled by the said cooling means. The installation also comprises an insulating enclosure positioned immediately above the perforated band and which contains the disintegration and cooling means, and means for trapping the ascending gaseous and/or solid by-products.

17 Claims, 5 Drawing Figures

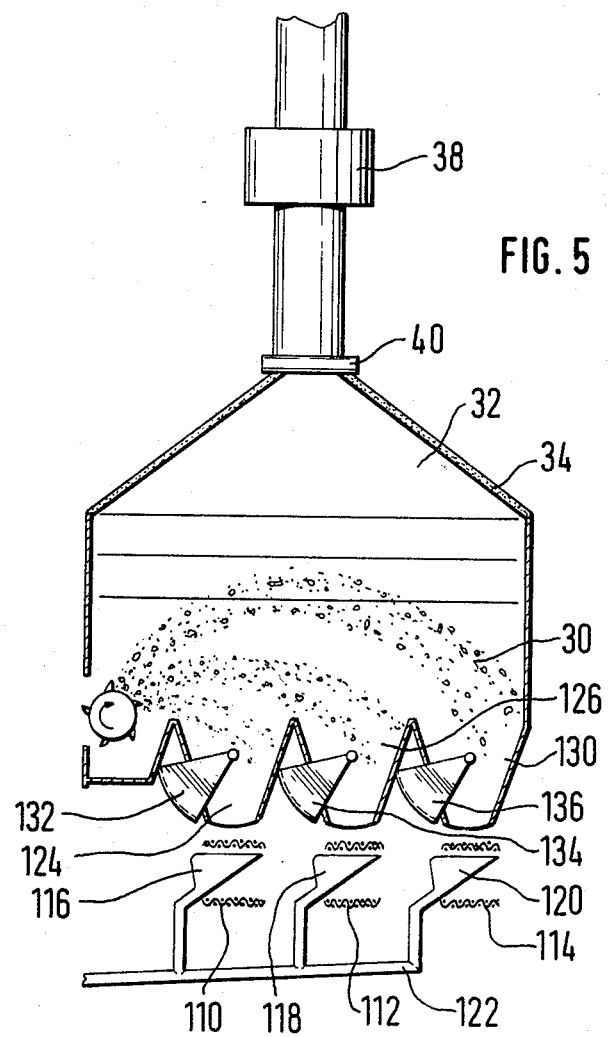

TREATMENT AND HANDLING OF METALLURGICAL SLAG

This is a continuation, of application Ser. No. 840,219 filed Oct. 7, 1977, now abandoned.

The present invention relates to an installation for the treatment and handling of metallurgical slag, the installation having means for the disintegration by mechanical impacts, of a flow of pyroplastic slag, and cooling means for the cooling of the particles of slag formed by the disintegration. The invention also relates to a process to be performed in the installation.

The large quantities of slag produced in a siderurgical plant, particularly in blast furnaces, raise serious problems connected with its handling and disposal. These problems become increasingly serious in modern high-performance blast furnaces capable of a daily output of up to 4000 tons of slag which is released from the furnace at a temperature of 1400°–1500° C. Intensive research has so far been carried out in order to develop processes enabling these masses of slag to be converted into commercial viable forms. This conversion entails the solidification of the slag into a vitrified or crystalline state after it has emerged from the furnace as a liquid or as a pasty mass. The solidification is effected by cooling, the speed of which may vary. Before this cooling can be carried out, however, the mass of liquid or pasty slag has to be disintegrated in order to reduce the particles to a manageable size.

There are at present two different widely applied processes for the disintegration of slag. In the most common of the two, the flow of liquid slag is caused to drop into a granulation pit, a large quantity of water under pressure being injected into the freely falling mass of slag in order to disintegrate the slag into a large number of tiny particles. These particles at the same time undergo rapid cooling and are collected in a water bed at the bottom of the granulation pit. The main drawback of this system of conversion is the fact that it necessitates the use of considerable quantities of water, frequently up to 10 m$^3$ per ton of granulated slag. Thus this system is not only uneconomical from the point of view of water consumption but also requires large and expensive installations for the reseparation of the water from the granulated slag and for the drying of the slag.

This known type of plant suffers from yet a further drawback from an ecological point of view, inasmuch as the sudden cooling of the hot slag causes considerable quantities of gaseous by-products to be given off into the atmosphere.

A further known means for the disintegration of the mass of liquid slag is the application thereto of mechanical impacts. Such an installation, mentioned in the preamble, is described in the Belgian Pat. No. 847.483. This patent specification proposes a process and installation for the manufacture of expanded slag, including the mechanical disintegration of a current of pyroplastic slag, by the aid of a rotary drum. In this process the molten slag is first subjected to a free expansion operation comprising a first expansion phase in the course of the flow of the continuous current of slag through an inclined channel into which water under pressure is injected via the base, and then subjected to a second expansion phase in the course of the substantially free fall of the current of slag onto the rotary drum. The sheet of slag falling onto this drum is fragmented and flung into the air by the blades provided on the drum. In the course of their trajectory the particles assume more or less spherical shapes and fall onto the ground at a certain distance from the drum. In the final portion of their trajectory the particles of expanded slag can pass through sprayed water which promotes their coagulation and solidification.

It has recently been discovered that the installation proposed by the said Belgian Pat. No. 847.483 may be used not only for the manufacture of expanded slag but also for the production of granulated slag of the type known in connection with a conventional granulation plant. This process is proposed in the Luxembourg patent application No. 77.160 of Apr. 19, 1977. Granulated slag can be produced in this way if various operating parameters, such as the rotation speed of the drum and the quantity of water added, are controlled accordingly. To the extent which the drum speed is increased and which the quantity of water added during the expansion phase is reduced, the proportion of granulated slag increases at the expense of the proportion of expanded slag.

It has nevertheless been found that as the peripheral speed of the disintegration drum is increased, the production of more and more filamentous substance resembling mineral wool, hereinafter called "wool" for the sake of simplicity, results. The proportion represented by this wool may reach 5%, thereby constituting a daily output of 2000 m$^3$ of wool in a furnace having a daily production capacity of 4000 tons of slag. This production of wool is to be regarded as a drawback as long as there is no commercial outlet for it, so that the wool constitutes waste matter which must be recycled into the slag manufacturing process.

The slag treatment method based on mechanical disintegration, as described in the Belgian Pat. No. 847.483, raises ecological problems owing to the release of gaseous by-products in exactly the same manner as the granulation processes based on hydraulic disintegration. The installation described in the Belgian patent specification also suffers from the drawback that the operation of the rotary drum produces a considerable amount of noise.

On the other hand, rotary drum installations offer the advantage, by comparison with the granulation pits, of a saving of water which may amount to up to 90%. Due to this saving of water, the plant for separating water from the granulated or expanded slag, as well as the drying installations, are simplified and rendered less expensive.

The two types of installations described above further suffer from the common drawback that they do not allow for a continuous operation. In other words, the production of granulated or expanded slag has to be periodically interrupted to enable it to be evacuated, and vice versa. Therefore, a pair of treatment units have to be installed so that one unit can function while the other is shut off.

A further disadvantage shared by the two types of known installations is that they enable only one clearly defined usable product to be obtained, such as, by way of example, grains of slag of variable granulometry. As described above, the rotary drum plant may produce either expanded or non-expanded grains of slag, or even "wool", but there is always only one main product in acceptable rate of output and quality. Any other products accompanying the main product constitute by-products or waste and have to be recycled (as in the case of wool) or tolerated in the main product, with or without intermediate treatment.

A Luxembourg patent application entitled "Process and apparatus for utilization of metallurgical slags, particularly blast furnace slags", filed on Sept. 26, 1977 in the name of the "Aciéries Réunies de Burbach-Eich-Dudelange S.A., ARBED", proposes a new process for the treatment of metallurgical slag for the purpose of surmounting these difficulties and solving the problems stated, this process being based on mechanical disintegration effected by means of a rotary drum such as described above. By the judicious selection of the production parameters available, this new process is intended to enable one or more products such as granulated slag, expanded slag or wool, to be produced separately or simultaneously according to the requirements of the market, in the quantity and quality required for a commercial outlet.

The purpose of the present invention is to provide an installation of the type mentioned in the preamble and to enable use to be made of the process defined above and proposed in the application filed in the name of the ARBED, while at the same time avoiding the drawbacks of each of the two known types of liquid slag disintegration and retaining their advantages. In other words, the purpose of the invention is to provide a new installation which ensures a greater saving of invested plant and a lower rate of water consumption than the known granulation equipment, which will produce less noise than the known plant for the manufacture of expanded slag, which will allow a continuous operation, which will enable three usable products to be obtained simultaneously or separately, and which will not contaminate the atmosphere by releasing gaseous by-products.

According to the invention there is provided an installation for the treatment and handling of metallurgical slag having means for the disintegration, by mechanical impacts, of a flow of pyroplastic slag, and cooling means for the cooling of the particles of slag formed by the said disintegration, said installation comprising at least one perforated endless band positioned in the path of fall of the particles of slag which are projected by the said disintegration means and cooled by the said cooling means, an insulating enclosure positioned immediately above the perforated band and containing the said disintegration and cooling equipment, and means for trapping the ascending gaseous and/or solid by-products.

The disintegration means may consist, as in Belgian Pat. No. 847.483, of a drum fitted with peripheral blades and rotating about its substantially horizontal axis, or any other suitable mechanical means.

The perforated band preferably consists of a stainless steel wire network which retains most of the particles of slag but enables the water to pass through. In a first embodiment of the apparatus, this band turns in a direction substantially parallel to the path followed by the particles of slag flung off by the drum, while in a second embodiment it turns in a direction substantially perpendicular to the said trajectory.

The particles of slag can be intercepted in their fall either by the band itself or by intermediate storage bins, provided in the lower part of the enclosure as viewed in the direction of the path followed by the slag. The presence of such intermediate bins may be necessary or desirable for reasons connected with the process, such as the prolongation of the cooling phase or slag particle conversion phase, or in order to enable a sizing in accordance with the grain size of the particles. In the shower of slag scattered by the drum, the particles of slag separate under the effect of the centrifugal force in accordance with their masses, so that the larger dimensions are found towards the outside, the particles becoming increasingly fine the nearer they are to the drum. Sampling of this kind in the production stage simplifies the subsequent sorting hitherto required or even enables sorting to be dispensed with altogether.

The perforated band performs the dual function of conveying and conditioning the particles of slag. The conditioning results from the fact that the cooling, drying and draining of the particles of slag can be controlled by selecting the appropriate speed in accordance with the other parameters such as the temperature and the quantity of water used.

The conveying function of the perforated band is extremely important in achieving a number of purposes of the invention. In particular, it enables the slag to be evacuated as and when it is produced, or in other words the discharge of the slag from the furnace and its treatment by the drum do not have to be interrupted in order to enable the solidified particles of slag to be evacuated, or vice versa. In addition to the evacuation of the slag, the band enables the water to be continuously evacuated by a draining operation. The particles are thus no longer thrown onto a wet mass or into a pool of water.

Due to the permanent evacuation of the granulated or expanded slag the enclosure around the plant can be kept closed, since the product no longer has to be evacuated on self-propelling conveyances. This enclosure enables the noise to be considerably reduced by means of walls with good sound-proofing properties. The enclosure also makes it possible to intercept most of the ascending gaseous or solid by-products so that they can be purified or recycled. The enclosure even enables the "wool" to be intercepted in a mobile filter, so that the wool can be withdrawn from the enclosure as and when it is produced.

According to the invention a process is provided for the treatment and handling of metallurgical slag in which a flow of liquid slag is disintegrated mechanically and thrown to a certain distance in the form of particles of varying degrees of fineness, after which these particles are cooled, wherein the disintegration and the cooling are effected inside a closed insulating enclosure from which the particles of solidified slag are evacuated continuously or intermittently at a rate which varies according to the properties required in the slag to be produced and/or to the temperature and quantity of water used, said process further comprising the steps of preventing the gaseous by-products from directly escaping into the atmosphere, intercepting the ascending solid by-products in a filter, and separating the water from the solidified particles of slag as and when the latter occur.

Further special features and advantages of the invention will emerge from a perusal of the description of certain embodiments thereof, given below and by way of an example and by reference to the accompanying drawings wherein:

FIG. 5 is schematic diagram of a variant of the two embodiments shown in the aforementioned diagrams, obtained by providing a number of bands substantially parallel to the disintegration drum.

Figure 1:
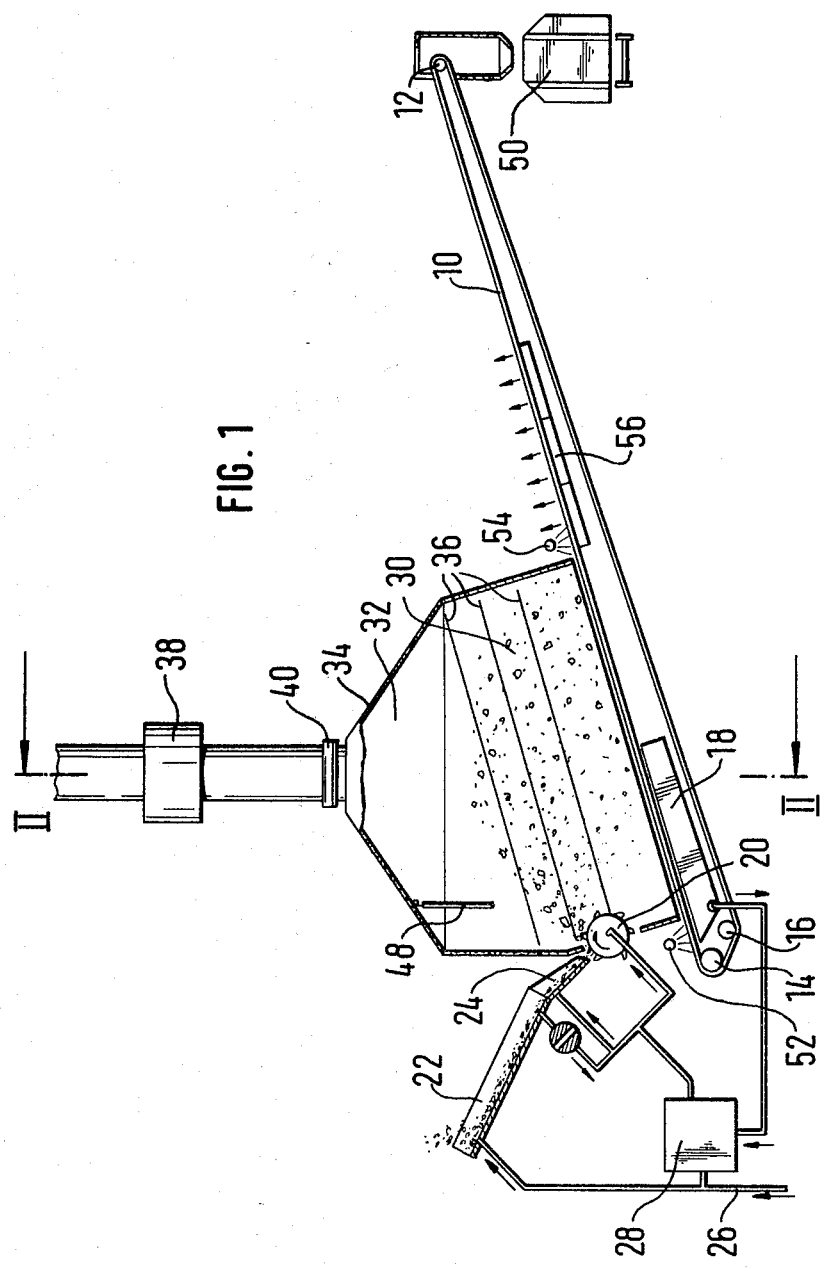
FIG. 1 is a schematic longitudinal section through a first embodiment of the invention.
Figure 2:
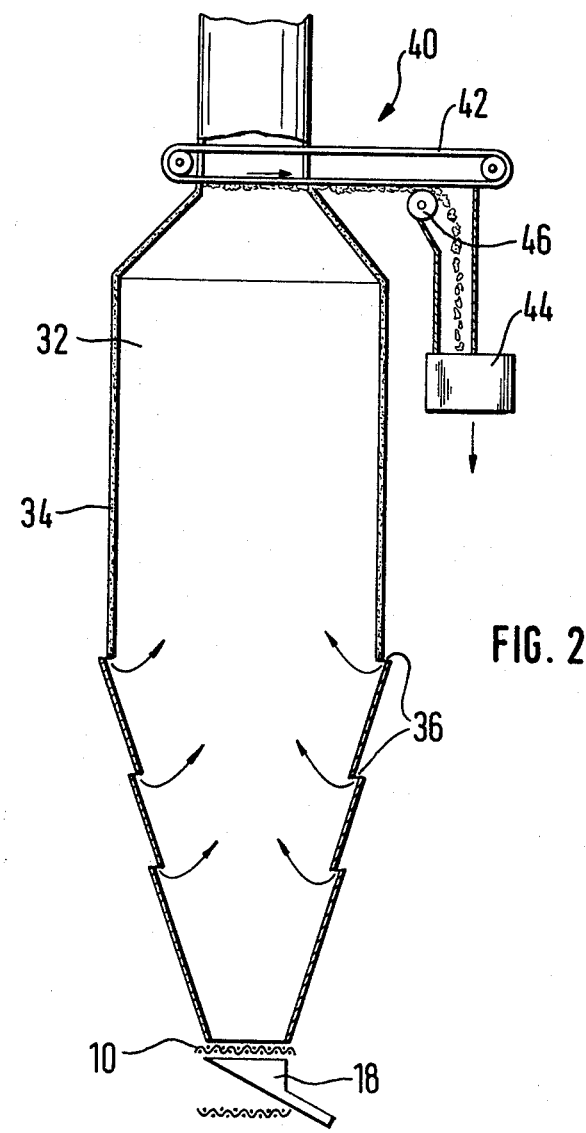
FIG. 2 is a schematic cross section along the line II—II of FIG. 1.

In the first embodiment, shown in FIGS. 1 and 2, an endless perforated conveyor band 10 is driven around two cylinders 12 and 14 by means known per se and not illustrated. A third cylinder 16 may be provided, for the purpose of regulating the tension of the perforated band 10 and/or ensuring a sufficient gap between the lower and the upper side of the band to leave room for the installation of a water collector 18.

The slag, in the molten or pyroplastic state, is fed from a furnace, not shown, via a channel 22 and an inclined surface 24 and falls onto a disintegration drum 20, as described in the Belgian patent specification No. 847.483. As in the patent and with a view to the production of expanded slag, a water supply line 26 is provided for the introduction of suitable quantities of water into the channel 22, onto the inclined surface 24 and into the rotary drum 22. A suitable device for the control of the temperature of the water used during these various phases is shown at 28. The reference number 30 indicates the shower of slag distributed by the rotation of the drum 20 from the sheet of slag fed to it via the inclined surface 24. In the embodiment shown in FIG. 1, the perforated band 10 is positioned longitudinally, i.e. substantially parallel to the trajectory followed by the particles flung off by the drum 20.

The perforated band 10 may consist, for example, of a stranded or lattice-work metal band such as known under the trade name of "Sandwik Track Matic". A band of this kind is in actual fact a flexible lattice made up of stainless steel wires. The length and width selected will naturally depend on the output capacity of the furnace equipped with this installation. In an experimental model with a drum 20 of 1.80 m in length a conveyor band of 1.5 m in width was found sufficient. This comparatively moderate width for the perforated band 10, by comparison with the length of the drum 20, is possible as a result of the particular shape given to the enclosure provided in the installation as will be described in detail farther on.

The enclosure as a whole is marked 32. This enclosure 32 is positioned immediately above the perforated band 10, just beyond the point where the band 10 passes around the cylinder 14. For reasons to be explained in greater detail hereinafter, a set of supplementary apertures should preferably be provided on a level with air admission slits 36.

The purpose of making the required apertures as small as possible is a substantial reduction in the transmission, of the noise caused by the drum 20 to the outside. For this same reason, the wall 34 should preferably be so designed as to assist this noise reduction, i.e. by using concrete, for example, for the greater part of the wall. The concrete also offers the advantage, in comparison with metal, of being more resistant to corrosion.

A purifying and neutralizing device for the gases produced in the enclosure 32 is shown at 38. This purifying and neutralizing device 38 prevents the possibility of toxic gases being released into the atmosphere.

A device for the recuperation of the slag wool is shown schematically by the reference number 40 (see also FIG. 2). This wool recuperation device 40 preferably consists of an endless rotary filter 42 rotating about two cylinders. This filter 42 may also be formed by a relatively fine metal lattice on which the filaments of wood are caught. Filter 42 is caused, by means not shown, to move at a speed suitable for the quantity of wool produced, so that the wool can be evacuated as and when it is intercepted by the mesh. A scraper 46 situated outside the enclosure 32 serves to remove the slag wool which has been intercepted by the filter 42 and to cause the wool to drop into a reservoir 44.

As may be seen from FIG. 2, the lower portion of enclosure 32 is trapezoidal in shape thereby enabling a smaller width to be adopted for the perforated band 10. A screen is shown schematically at 48. This screen 48 may be lowered and raised by means known per se and not shown in the drawing. Screen 48 is intended to be lowered in front of the drum 20 at the beginning of the process when the water is introduced into the system after the apparatus has been started up but prior to the introduction of the molten slag. The purpose of this screen 48 is to prevent water from being splashed over the entire internal portion of the wall 34. As soon as the slag falls onto the drum 20, screen 48 is raised into the position shown in FIG. 1.

During the operation of the installation shown in FIG 1, the particles thrown off by the drum 20 fall directly onto the perforated band 10 in a parabolic trajactory. According to the peripheral speed of the drum 20, the angle of inclination of the blades and also the masses of the particles present, the particles will fall at a greater or smaller distance from the drum. The shower 30 flung off by the drum 20 consists mainly of little drops of sand, pellets of expanded slag, particles of granulated slag, or slag powder, and filamentous parts constituting "slag wool". The proportion and quality of these various constituents of the shower 30 are determined by the operating parameters, particularly the peripheral speed of the drum 20, the quantity of water injected in the pre-expansion stage into the channel 22 and on a level with the drum 20, the temperature of the water and also other parameters, and forms the subject of the aforementioned Luxembourg patent application filed in the name of the ARBED.

As the solidified particles fall onto the perforated band 10, they are evacuated by the band into a bucket 50 in a conveyance outside the enclosure. It is desirable for the solid particles, when they fall into the bucket 50, to be as dry and cold as possible. The speed selected for the band 10 will thus depend on these criteria, on the one hand, and on the nature of the particles concerned as well as on their temperature and degree of moisture when they fall onto the band 10, on the other. It should be noted that there is a certain duality between the conceptions of moisture and temperature in view of the fact that the particles conveyed by the band 10 are dried by the supply of heat from the new particles, while the new particles are cooled by the particles already deposited on the perforated band 10.

It is preferable to provide an irrigation ramp 52 for the irrigation of the perforated band 10 immediately before it enters the enclosure 32, in order to form a thin film of water on the band. This provides the dual advantage of preventing the band from wearing out too rapidly as a result of the still hot particles falling onto it and of ensuring the more complete cooling and solidification of the particles.

The water which drains out through the mesh of the perforated band 10 is collected in the collector 18. The collected water is sufficiently clean to be recycled into the installation so that no purification or sludge treatment plant is required. For this purpose, the water passes through the temperature control device 28 where it is mixed in suitable quantities with the cold water in order to ensure a suitable temperature of the water entering the slag treatment process. This recycling of the water enables further water to be saved in addition to the saving provided by the mechanical disintegration system of the drum 20, this saving being considerable by comparison with that obtainable in the case of conventional types of granulation pits.

A final irrigation ramp 54 positioned above the band 10 and outside the enclosure 32 can be put into operation when the temperature of the sheet of slag evacuated from the enclosure 32 is considered excessive. At 56, an auxiliary cooling system is shown which can likewise be put into operation when the temperature of the solidified slag is not low enough. Cooling system 56 may be based on air or on a supplementary drying operation.

Needless to say, the ramp 54 and the blower 56 can be started up automatically by means of thermo-couples, not shown.

The purpose of the air admission slits 36 is to assist a current of air in ascending inside the enclosure which stimulates the ascent of the gaseous products and of the slag wool. It is even possible to provide a blower inside the two parts of the perforated belt 10 to blow through the belt into the enclosure 32, thus providing an ascending flow of forced air.

The purpose of the wool recuperated in the reservoir 34 depends on its quantity and quality. The control of these two likewise forms the subject of the aforementioned Luxembourg patent application in the name of the ARBED. If the quantity of wool thus produced is sufficient it can be transferred to a treatment device in order to be converted into forms for which there is a commercial demand. In particular, the wool can be converted into slabs by the addition of a hydraulic binding agent for use as insulating slabs. If the quality and quantity of the wool recuperated are not such as to justify this treatment or use, the wool can be recycled by incorporating it into the flow of liquid slag upstream from the channel 22. This wool can also be transferred to a mill and, in view of its good hydraulic properties, incorporated into the granulated and/or expanded slag after crushing.

In addition to the ecological advantages offered by the use of the enclosure 32, particularly with regard to the emission of noise and the pollution of the atmosphere, the enclosure enables the heat given off to be largely controlled. This heat can be used in different ways, e.g. in the device 28 for the control of the temperature of the water which plays a part in the slag treatment process. This recuperation of the heat can be combined with the recuperation of the steam via a condensation stage. This provides an additional saving of water.

Figure 3:
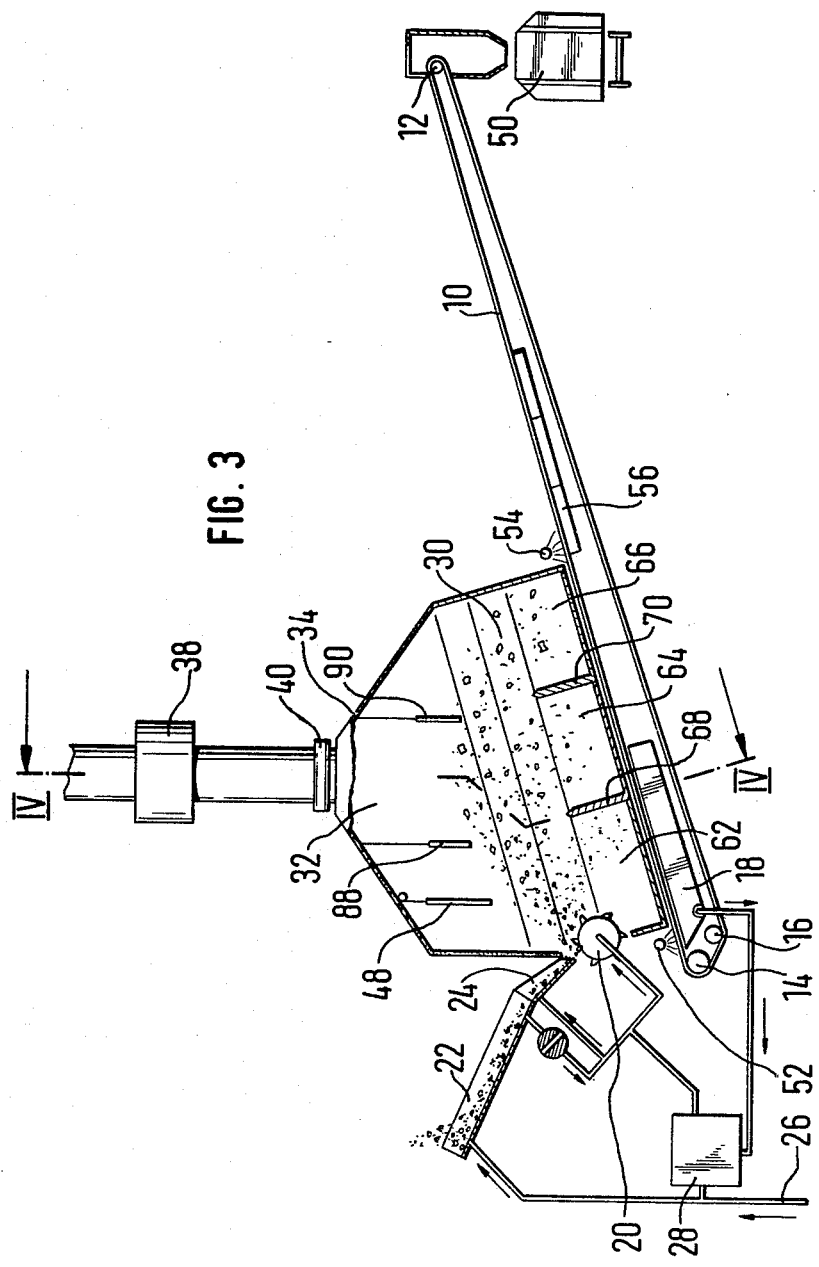
FIG. 3 is a longitudinal section through a second embodiment of the invention.
Figure 4:
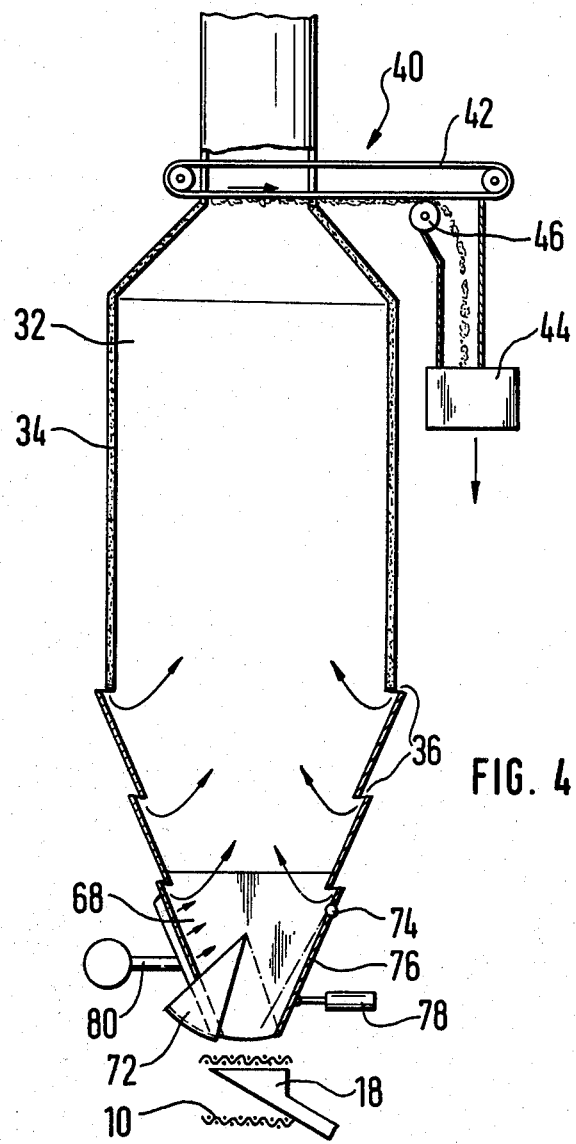
FIG. 4 is a schematic cross section along the line IV—IV of FIG. 3.

FIGS. 3 and 4 are views of a second embodiment of the invention similar to FIGS. 1 and 2 respectively. The same reference numbers have been used for many components already appearing in the corresponding FIGS. 1 and 2. The enclosure 32 in this second embodiment is subdivided, in the direction of the path followed by the particles of slag flung off by the drum 20, into a number of compartments forming bins 62, 64 and 66 for the reception and intermediate storage of the material. This subdivision is effected by partitions 68 and 70 positioned perpendicularly to the direction of motion of the perforated band 10 and in the trapezoidal lower portion of the enclosure 32.

In the bottom of each of these bins 62, 64 and 66 is a clack valve 72 (see FIG. 4) serving to open or shut the corresponding bin. The closure device for this valve 72 preferably consists of a cylindrical surface capable of pivoting about its center of curvature. Each of these valves is controlled by means not shown in the drawing but known per se, such as hydraulic jacks.

At least one (76) of the lateral walls of each of the bins 62, 64, 66 is movable about a hinge 74 connecting this movable wall 76 with the remainder of the wall 34 of the enclosure 32. Each of these movable walls 76 is actuated by a jack 78 about the hinge 74. The jack 78 is actuated during the emptying of the bin with which it is associated in order to assist the flow on the band 10, i.e. to prevent the formation of an internal "bridge" and break up any cakes of slag forming in that position and obstructing the outlet. The mobility of the wall 76 may also be utilized for the purpose of increasing or reducing the size of the outlet aperture of the bin, i.e. the output rate from the bin.

With each of the bins 62, 64 and 66 is associated a pipe 80 through which a coolant fluid such as water, steam or air is to be injected into the bin concerned.

The number of bins, being three in the example shown in FIG. 3, can obviously be increased or reduced according to the needs of each installation.

A first purpose of the provision of these various bins inside the enclosure is to widen the range of possibilities for ensuring a final product of the desired quality and properties. When, for example, comparatively voluminous pellets of expanded slag are produced, it may be desirable to prolong the cooling phase and transformation phase for the internal structure of the pellets and thus to retard their fall onto the perforated band 10. In addition to the possibility of prolonging the cooling phase, the pipes 80 enable the cooling phase to be accelerated by the injection of a fluid coolant.

A second purpose of these bins 62, 64 and 66 is to enable the particles of slag to be sampled in accordance with their respective mass. Owing to the centrifugal force prevailing, the heaviest particles drop into the farthest bin 66, while those of lighter weight are collected in the bin 62. These bins can naturally be emptied independently and in succession to one another without interrupting the disintegration and distribution of slag by the drum 20.

The natural selection effected by the centrifugal force can be influenced by means of panels 88 and 90 mounted inside the enclosure 32. These panels 88 and 90 are mounted by means known per se in such a way that they can be lowered to a greater or smaller depth in the shower 30 of slag flung off by the drum 20 and in such a way as to deflect certain categories of particles into one or other of the subjacent bins 62, 64 and 66. The number of such panels 88 and 90 will in principle be equal to the number of partitions 68 and 70 defining the bins.

FIG. 5 is a schematic diagram of a variant of the above embodiments and provides for a number of perforated endless bands which are caused to move in a direction substantially perpendicular to the trajectory of the particles thrown off by the disintegration drum. This diagram is limited to the components required for the comprehension of the operation of the system, while the components identical with any shown in FIGS. 1–4 are given the same reference numbers as in the latter.

The perforated bands are shown schematically in cross section and are marked 110, 112 and 114. Between the upper and the lower side of these bands are collectors 116, 118 and 120 by which the drainage water is guided into one common pipe 122. The lower portion of the enclosure is subdivided into a number of bins 124, 126 and 130 associated with closure valves 132, 134 and 136 respectively, these valves being analogous to the clack valve 72 shown in FIG. 4. These bins may also be provided with pivotable walls similar to the wall 76 in FIG. 4. In the variation shown in FIG. 5, the operation can be continuous, i.e. the valves 132, 134 and 136 can be left open and the particles of solidified slag can be caused to fall directly onto the bands 110, 112 and 114. It is also possible to operate in accordance with FIG. 4 with intermediate storage of material in the bins. It is even possible to store material in the farthest bin 130 which generally contains bulkier particles, requiring longer cooling, and leave the valve 132 and/or the valve 134 in order to evacuate the smallest particles continuously.

The embodiment shown in FIG. 5 offers the advantage that several categories of particles differing in grain size can be evacuated simultaneously, whereas in that shown in FIG. 4 they have to be evacuated separately and then guided in the various directions required at the end of the perforated band.

The cooling process and period for the particles of slag thrown off by the drum 20 depend essentially on the nature of the particles to be produced. Where balls of expanded slag of several cm in diameter are being produced the cooling must be carried out progressively and in contact with the air. It is therefore important that the trajectory should be sufficiently long so as to enable this cooling to take place. In this case it is also preferable to adopt the second embodiment shown, i.e. to provide for intermediate storage of material, not only in order to prolong the period for the cooling of the balls of expanded slag, but also in order to prevent the band from deteriorating as a result of the excessive temperature of the balls of slag.

If it is desired to produce granulated slag or powdered slag consisting essentially of vitrified particles of a size of less than 5 mm, rapid cooling must be effected. This rapid cooling is thus carried out by means of water and the length of the path followed by the particles is shorter than that required for the production of expanded slag. As excess water is continuously evacuated via the perforated band, the quantity of water can be increased in order to ensure sudden cooling of the particles of slag. It should be noted that in the case of the manufacture of granulated slag by means of this installation, no pre-expansion is effected at the level of the channel feeding the slag onto the disintegration drum. It is nevertheless preferable for the slag to be pre-cooled with water, for example, down to its lower limit of pyroplasticity, before its disintegration at the level of the drum. The consumption of water is thus essentially limited to the irrigation of the shower of particles flung off by the drum 20 in order to cause the grains of slag to cool suddenly and solidify rapidly.

Experience has shown that less than 0.8 m$^3$ of water per ton of dry slag produced is required and that the degree of moisture of the granulated slag thus produced is below 2%. In other words, with an installation according to the present invention, it is possible to produce dry granulated slag with a water consumption rate reduced at least ten-fold by comparison with that involved in conventional granulation pits, which also require further units of apparatus for the separation of the water from the slag and for the drying of the slag.

If the installation proposed is only to be used for the production of granulated slag, it can be made far smaller and more compact than that proposed above for a number of different products (granulated slag, expanded slag and slag wool) without thereby sacrificing any of the advantages. This reduction in size is rendered possible by the fact that the granulated slag is suddenly cooled in water while the expanded slag must be cooled more slowly in the air so that the trajectory over which the granulated slag is caused to move when thrown off the drum can be shortened considerably. It is therefore first and foremost to the enclosure 32 that the aforementioned reduction of the dimensions applies. A more compact and less expensive installation of this kind thus offers great advantages for a specific circle of customers only wishing to produce granulated slag.

What we claim is:

1. An installation for the treatment and handling of metallurgical slag to produce, either separately or simultaneously, granulated slag, expanded slag and/or mineral wool and automatically collecting said products, and having means for the disintegration by mechanical impacts of a flow of pyroplastic slag and cooling means for the cooling of the particles of slag formed by the disintegration, said installation comprising at least one perforated endless band positioned in the path of fall of the particles of slag which are projected by said disintegration means and rotating substantially in a direction parallel to the path of projection of said particles and the particles are cooled by said cooling means, an insulating enclosure positioned immediately above said perforated band, a section of the lower part of said enclosure being trapezoidal in shape, decreasing in size in the direction of said perforated band, and having one or more air admission slits, said insulating enclosure containing said disintegration and cooling means and means for trapping the ascending gaseous and/or solid by-product of the slag, said means for trapping said solid being mounted in the upper portion of said enclosure and comprising an endless rotary filter rotating about two cylinders positioned outside the enclosure, a scraper to detach said solid from said filter and a reservoir to collect said detached solid.

2. An installation as claimed in claim 1, wherein the disintegration means consists of a drum fitted with peripheral blades and rotating about its substantially horizontal axis.

3. An installation as claimed in claim 1, wherein the perforated band consists of a stainless steel wire network driven around a number of cylinders, the size of the interstices of this lattice-work being such that most of the particles of solidified slag produced are held back but water can pass into a collector installed underneath that portion of the band onto which the particles are flung.

4. An installation as claimed in claim 1, wherein the band is inclined at an angle, the evacuation of particles being effected in the upward direction.

5. An installation as claimed in claim 1, wherein the enclosure is subdivided in the lower part and in the direction taken by the path followed by the particles of slag into a number of compartments forming bins for the reception and storage of the said particles, the base of each of these bins being fitted with a closure device.

6. An installation as claimed in claim 5, wherein the closure device consists of a cylindrical clack valve capable of pivoting about its axis of curvature.

7. an installation as claimed in claim 5, further comprising a hinge provided between at least one of the lateral walls of each of the bins and the upper portion of this same wall of the enclosure, the lower portion being movable about the said hinge and connected for this purpose to the bar of a hydraulic jack.

8. An installation as claimed in claim 7, further comprising a cooling fluid feed pipe leading into each of the bins.

9. An installation as claimed in claim 1 further comprising a device for purifying and/or neutralizing the gaseous by-products occurring in the enclosure, this device being mounted above the slag wool recuperation device in an outlet channel of the enclosure.

10. An installation as claimed in claim 1 further comprising an irrigation ramp provided for the perforated band and immediately preceding the point where this band penetrates below the enclosure.

11. An installation as claimed in claim 1, further comprising a water cooling device positioned at the outlet of the band from the enclosure.

12. An installation as claimed in claim 1 further comprising an air cooling device positioned at the outlet of the band from the enclosure.

13. Process for the treatment and handling of metallurgical slag to produce granulated slag, expanded slag and/or mineral wool either separately or simultaneously and in which a flow of liquid slag is disintegrated mechanically and thrown to a certain distance, in the form of particles of varying degree of fineness, and collected on at least one perforated conveyor band rotating substantially in a direction parallel to the trajectory of the particles, after which these particles are cooled, wherein the disintegration and the cooling are effected inside a closed insulating enclosure from which the particles of solidified slag are evacuated continuously or intermittently at a rate which varies according to the properties required in the slag to be produced and/or to the temperature and quantity of water used, said process further comprising the steps of preventing the gaseous by-products from directly escaping into the atmosphere; intercepting the ascending solid by-products on a filter and separating the water from the solidified particles of slag as and when the latter occur and recycling said water for the treatment process for the hot slag.

14. A process as claimed in claim 13, wherein the solidified particles of slag are collected in intermediate storage bins positioned in the direction of the path followed by the said particles and wherein the particles are subjected to a thermal conditioning process by means of a coolant fluid before they are caused to fall onto at least one perforated conveyor band which enables water to be filtered.

15. A process as claimed in claim 13, wherein the solid by-products are removed from the filter and recycled into the liquid slag upstream from the point at which the slag undergoes disintegration.

16. A process as claimed in claim 13, wherein the solid by-products are removed from the filter and, after a suitable treatment phase, evacuated as mineral wool.

17. A process as claimed in claim 13, wherein the heat of the gaseous by-products is recuperated.

* * * * *